US006834926B2

(12) United States Patent
Shibata

(10) Patent No.: US 6,834,926 B2
(45) Date of Patent: Dec. 28, 2004

(54) INK-JET PRINTING APPARATUS AND METHOD, AND COMPUTER READABLE MEMORY

(75) Inventor: Tsuyoshi Shibata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/902,594

(22) Filed: Jul. 12, 2001

(65) Prior Publication Data

US 2002/0039118 A1 Apr. 4, 2002

(30) Foreign Application Priority Data

Jul. 14, 2000 (JP) ........................................ 2000-214796

(51) Int. Cl.[7] .................. B41J 2/205; H04N 5/04; H04N 1/46; G03F 3/08; G06F 15/00
(52) U.S. Cl. ..................... 347/15; 347/43; 358/502; 358/1.9; 358/521
(58) Field of Search ................ 347/15, 43; 358/502, 358/1.9, 521

(56) References Cited

U.S. PATENT DOCUMENTS

| 3,977,007 | A | * | 8/1976 | Berry et al. | 283/117 |
|---|---|---|---|---|---|
| 4,595,948 | A | * | 6/1986 | Itoh et al. | 347/43 |
| 4,638,373 | A | * | 1/1987 | Logan | 346/3 |
| 4,651,287 | A | * | 3/1987 | Tsao | 347/15 |
| 4,667,250 | A | * | 5/1987 | Murai | 358/3.13 |
| 4,680,645 | A | * | 7/1987 | Dispoto et al. | 347/131 |
| 4,714,964 | A | * | 12/1987 | Sasaki | 347/15 |
| 5,111,302 | A | * | 5/1992 | Chan et al. | 347/15 |
| 5,121,446 | A | | 6/1992 | Yamada et al. | 382/272 |
| 6,164,747 | A | * | 12/2000 | Yashima et al. | 347/15 |
| 6,193,347 | B1 | * | 2/2001 | Askeland et al. | 347/15 |
| 6,338,538 | B1 | * | 1/2002 | Toshiaki | 347/15 |
| 6,352,328 | B1 | * | 3/2002 | Wen et al. | 347/11 |
| 6,354,688 | B1 | * | 3/2002 | Inoue et al. | 347/15 |
| 6,483,940 | B1 | * | 11/2002 | Wang | 382/164 |

FOREIGN PATENT DOCUMENTS

| JP | 54-59936 | 5/1979 |
|---|---|---|
| JP | 2-210962 | 8/1990 |
| JP | 7-47698 | 2/1995 |

OTHER PUBLICATIONS

Floyd, et al., "An Adaptive Algorithm for Spatial Grey Scale," Society for Information Display Digest, 1975, pp. 36–37.

* cited by examiner

Primary Examiner—Stephen D. Meier
Assistant Examiner—Leonard Liang
(74) Attorney, Agent, or Firm—Fitzpatrick, Cella, Harper & Scinto

(57) ABSTRACT

Ink ejection/non-ejection from a plurality of ink ejection print elements is controlled by looking up a first table that indicates the correspondence between a plurality of inks and gray scale values of print pixels, and a second table indicating combinations of density distribution patterns of print pixels and ink ejection print elements in correspondence with gray scale values, in accordance with a pixel density pattern and its gray scale value.

12 Claims, 14 Drawing Sheets

FIG. 3

L···LEFT   R···RIGHT

| GRAY SCALE VALUE | DENSITY GRADIENT INFORMATION | No. | a-1-1 L | a-1-1 R | a-2-1 L | a-2-1 R | a-3-1 L | a-3-1 R | a-4-1 L | a-4-1 R | b-1-1 L | b-1-1 R | b-2-1 L | b-2-1 R | b-3-1 L | b-3-1 R | b-4-1 L | b-4-1 R |
|---|---|---|---|---|---|---|---|---|---|---|---|---|---|---|---|---|---|---|
| 1 | LU | 1 | 1 | 0 | 0 | 0 | 0 | 0 | 0 | 0 | 0 | 0 | 0 | 0 | 0 | 0 | 0 | 0 |
| 1 |  | 2 | 0 | 0 | 1 | 0 | 0 | 0 | 0 | 0 | 0 | 0 | 0 | 0 | 0 | 0 | 0 | 0 |
| 1 |  | 3 | 0 | 0 | 0 | 0 | 0 | 0 | 0 | 0 | 0 | 0 | 0 | 0 | 0 | 0 | 0 | 0 |
| 1 |  | 4 | 0 | 0 | 0 | 0 | 0 | 0 | 0 | 0 | 0 | 0 | 0 | 0 | 0 | 0 | 0 | 0 |
| 1 | RU | 5 | 0 | 1 | 0 | 0 | 0 | 0 | 0 | 0 | 0 | 0 | 0 | 0 | 0 | 0 | 0 | 0 |
| 1 |  | 6 | 0 | 0 | 0 | 1 | 0 | 0 | 0 | 0 | 0 | 0 | 0 | 0 | 0 | 0 | 0 | 0 |
| 1 |  | 7 | 0 | 0 | 0 | 0 | 0 | 1 | 0 | 0 | 0 | 0 | 0 | 0 | 0 | 0 | 0 | 0 |
| 1 |  | 8 | 0 | 0 | 0 | 0 | 0 | 0 | 0 | 1 | 0 | 0 | 0 | 0 | 0 | 0 | 0 | 0 |
| 1 | LL | 9 | 0 | 0 | 0 | 0 | 0 | 0 | 0 | 0 | 1 | 0 | 0 | 0 | 0 | 0 | 0 | 0 |
| 1 |  | 10 | 0 | 0 | 0 | 0 | 0 | 0 | 0 | 0 | 0 | 0 | 1 | 0 | 0 | 0 | 0 | 0 |
| 1 |  | 11 | 0 | 0 | 0 | 0 | 0 | 0 | 0 | 0 | 0 | 0 | 0 | 0 | 1 | 0 | 0 | 0 |
| 1 |  | 12 | 0 | 0 | 0 | 0 | 0 | 0 | 0 | 0 | 0 | 0 | 0 | 0 | 0 | 0 | 1 | 0 |
| 1 | RL | 13 | 0 | 0 | 0 | 0 | 0 | 0 | 0 | 0 | 0 | 1 | 0 | 0 | 0 | 0 | 0 | 0 |
| 1 |  | 14 | 0 | 0 | 0 | 0 | 0 | 0 | 0 | 0 | 0 | 0 | 0 | 1 | 0 | 0 | 0 | 0 |
| 1 |  | 15 | 0 | 0 | 0 | 0 | 0 | 0 | 0 | 0 | 0 | 0 | 0 | 0 | 0 | 1 | 0 | 0 |
| 1 |  | 16 | 0 | 0 | 0 | 0 | 0 | 0 | 0 | 0 | 0 | 0 | 0 | 0 | 0 | 0 | 0 | 1 |
| 2 | LU | 17 | 1 | 0 | 1 | 0 | 0 | 0 | 0 | 0 | 0 | 0 | 0 | 0 | 0 | 0 | 0 | 0 |
| 2 |  | 18 | 0 | 0 | 1 | 0 | 1 | 0 | 0 | 0 | 0 | 0 | 0 | 0 | 0 | 0 | 0 | 0 |
| 2 |  | 19 | 0 | 0 | 0 | 0 | 1 | 0 | 1 | 0 | 0 | 0 | 0 | 0 | 0 | 0 | 0 | 0 |
| 2 |  | 20 | 1 | 0 | 0 | 0 | 0 | 0 | 1 | 0 | 0 | 0 | 0 | 0 | 0 | 0 | 0 | 0 |
| 2 | RU | 21 | 0 | 1 | 0 | 1 | 0 | 0 | 0 | 0 | 0 | 0 | 0 | 0 | 0 | 0 | 0 | 0 |
| 2 |  | 22 | 0 | 0 | 0 | 1 | 0 | 1 | 0 | 0 | 0 | 0 | 0 | 0 | 0 | 0 | 0 | 0 |
| 2 |  | 23 | 0 | 0 | 0 | 0 | 0 | 1 | 0 | 1 | 0 | 0 | 0 | 0 | 0 | 0 | 0 | 0 |
| 2 |  | 24 | 0 | 1 | 0 | 0 | 0 | 0 | 0 | 1 | 0 | 0 | 0 | 0 | 0 | 0 | 0 | 0 |
| 2 | LL | 25 | 0 | 0 | 0 | 0 | 0 | 0 | 0 | 0 | 1 | 0 | 1 | 0 | 0 | 0 | 0 | 0 |
| 2 |  | 26 | 0 | 0 | 0 | 0 | 0 | 0 | 0 | 0 | 0 | 0 | 1 | 0 | 1 | 0 | 0 | 0 |
| 2 |  | 27 | 0 | 0 | 0 | 0 | 0 | 0 | 0 | 0 | 0 | 0 | 0 | 0 | 1 | 0 | 1 | 0 |
| 2 |  | 28 | 0 | 0 | 0 | 0 | 0 | 0 | 0 | 0 | 1 | 0 | 0 | 0 | 0 | 0 | 1 | 0 |
| 2 | RL | 29 | 0 | 0 | 0 | 0 | 0 | 0 | 0 | 0 | 0 | 1 | 0 | 1 | 0 | 0 | 0 | 0 |
| 2 |  | 30 | 0 | 0 | 0 | 0 | 0 | 0 | 0 | 0 | 0 | 0 | 0 | 1 | 0 | 1 | 0 | 0 |
| 2 |  | 31 | 0 | 0 | 0 | 0 | 0 | 0 | 0 | 0 | 0 | 0 | 0 | 0 | 0 | 1 | 0 | 1 |
| 2 |  | 32 | 0 | 0 | 0 | 0 | 0 | 0 | 0 | 0 | 0 | 1 | 0 | 0 | 0 | 0 | 0 | 1 |
| 2 | AV | 33 | 1 | 0 | 0 | 0 | 0 | 0 | 0 | 0 | 1 | 0 | 0 | 0 | 0 | 0 | 0 | 0 |
| 2 |  | 34 | 1 | 0 | 0 | 0 | 0 | 0 | 0 | 0 | 0 | 0 | 1 | 0 | 1 | 0 | 0 | 0 |
| 2 |  | 35 | 1 | 0 | 0 | 0 | 0 | 0 | 0 | 0 | 0 | 0 | 0 | 0 | 1 | 0 | 0 | 0 |
| 2 |  | 36 | 1 | 0 | 0 | 0 | 0 | 0 | 0 | 0 | 0 | 0 | 0 | 0 | 0 | 0 | 0 | 1 |
| 2 |  | 37 | 0 | 0 | 1 | 0 | 0 | 0 | 0 | 0 | 0 | 1 | 0 | 0 | 0 | 0 | 0 | 0 |
| 2 |  | 38 | 0 | 0 | 1 | 0 | 0 | 0 | 0 | 0 | 0 | 0 | 0 | 1 | 0 | 0 | 0 | 0 |
| 2 |  | 39 | 0 | 0 | 1 | 0 | 0 | 0 | 0 | 0 | 0 | 0 | 0 | 0 | 0 | 1 | 0 | 0 |
| 2 |  | 40 | 0 | 0 | 1 | 0 | 0 | 0 | 0 | 0 | 0 | 0 | 0 | 0 | 0 | 0 | 0 | 1 |
| 3 | LU | 41 | 1 | 0 | 1 | 0 | 0 | 0 | 0 | 0 | 0 | 1 | 0 | 0 | 0 | 0 | 0 | 0 |
| 3 |  | 42 | 0 | 0 | 1 | 0 | 1 | 0 | 0 | 0 | 0 | 0 | 0 | 1 | 0 | 0 | 0 | 0 |
| 3 |  | 43 | 0 | 0 | 0 | 0 | 1 | 0 | 1 | 0 | 0 | 0 | 0 | 0 | 0 | 1 | 0 | 0 |
| 3 |  | 44 | 1 | 0 | 0 | 0 | 0 | 0 | 1 | 0 | 0 | 0 | 0 | 0 | 0 | 0 | 0 | 1 |
| 3 | RU | 45 | 0 | 1 | 0 | 1 | 0 | 0 | 0 | 0 | 1 | 0 | 0 | 0 | 0 | 0 | 0 | 0 |
| 3 |  | 46 | 0 | 0 | 0 | 1 | 0 | 1 | 0 | 0 | 0 | 0 | 1 | 0 | 0 | 0 | 0 | 0 |
| 3 |  | 47 | 0 | 0 | 0 | 0 | 0 | 1 | 0 | 1 | 0 | 0 | 0 | 0 | 1 | 0 | 0 | 0 |
| 3 |  | 48 | 0 | 1 | 0 | 0 | 0 | 0 | 0 | 1 | 0 | 0 | 0 | 0 | 0 | 0 | 1 | 0 |
| 3 | LL | 49 | 0 | 1 | 0 | 0 | 0 | 0 | 0 | 0 | 1 | 0 | 1 | 0 | 0 | 0 | 0 | 0 |
| 3 |  | 50 | 0 | 0 | 0 | 1 | 0 | 0 | 0 | 0 | 0 | 0 | 1 | 0 | 1 | 0 | 0 | 0 |
| 3 |  | 51 | 0 | 0 | 0 | 0 | 0 | 1 | 0 | 0 | 0 | 0 | 0 | 0 | 1 | 0 | 1 | 0 |
| 3 |  | 52 | 0 | 0 | 0 | 0 | 0 | 0 | 0 | 1 | 1 | 0 | 0 | 1 | 0 | 0 | 1 | 0 |
| 3 | RL | 53 | 1 | 0 | 0 | 0 | 0 | 0 | 0 | 0 | 1 | 0 | 1 | 0 | 0 | 0 | 0 | 0 |
| 3 |  | 54 | 0 | 0 | 1 | 0 | 0 | 0 | 0 | 0 | 0 | 0 | 0 | 0 | 0 | 1 | 0 | 0 |
| 3 |  | 55 | 0 | 0 | 0 | 0 | 1 | 0 | 0 | 0 | 0 | 0 | 0 | 0 | 1 | 0 | 0 | 1 |
| 3 |  | 56 | 0 | 0 | 0 | 0 | 0 | 0 | 1 | 0 | 1 | 0 | 0 | 0 | 0 | 0 | 0 | 1 |
| 3 | AVE | 41 | 1 | 0 | 0 | 1 | 0 | 0 | 0 | 0 | 1 | 0 | 0 | 0 | 0 | 0 | 0 | 0 |
| 3 |  | 42 | 0 | 0 | 1 | 0 | 1 | 1 | 0 | 0 | 0 | 1 | 0 | 0 | 0 | 0 | 0 | 0 |
| 3 |  | 43 | 0 | 0 | 0 | 0 | 0 | 0 | 1 | 0 | 0 | 0 | 0 | 1 | 0 | 0 | 0 | 0 |
| 3 |  | 44 | 0 | 1 | 0 | 0 | 0 | 0 | 1 | 0 | 0 | 0 | 0 | 0 | 0 | 1 | 0 | 0 |

FIG. 4

L···LEFT  R···RIGHT

| GRAY SCALE VALUE | DENSITY GRADIENT INFORMATION | No. | a-1-1 L | a-1-1 R | a-2-1 L | a-2-1 R | a-3-1 L | a-3-1 R | a-4-1 L | a-4-1 R | b-1-1 L | b-1-1 R | b-2-1 L | b-2-1 R | b-3-1 L | b-3-1 R | b-4-1 L | b-4-1 R |
|---|---|---|---|---|---|---|---|---|---|---|---|---|---|---|---|---|---|---|
| 4 | LU | 45 | 1 | 0 | 1 | 0 | 1 | 0 | 0 | 0 | 0 | 1 | 0 | 0 | 0 | 0 | 0 | 0 |
| 4 |  | 46 | 0 | 0 | 1 | 0 | 1 | 0 | 1 | 0 | 0 | 0 | 0 | 1 | 0 | 0 | 0 | 0 |
| 4 |  | 47 | 1 | 0 | 0 | 0 | 1 | 0 | 1 | 0 | 0 | 0 | 0 | 0 | 0 | 1 | 0 | 0 |
| 4 |  | 48 | 1 | 0 | 1 | 0 | 0 | 0 | 1 | 0 | 0 | 0 | 0 | 0 | 0 | 0 | 0 | 1 |
| 4 | RU | 49 | 0 | 1 | 0 | 1 | 0 | 1 | 0 | 0 | 1 | 0 | 0 | 0 | 0 | 0 | 0 | 0 |
| 4 |  | 50 | 0 | 0 | 0 | 1 | 0 | 1 | 0 | 1 | 0 | 0 | 1 | 0 | 0 | 0 | 0 | 0 |
| 4 |  | 51 | 0 | 1 | 0 | 0 | 0 | 1 | 0 | 1 | 0 | 0 | 0 | 0 | 1 | 0 | 0 | 0 |
| 4 |  | 52 | 0 | 1 | 0 | 1 | 0 | 0 | 0 | 1 | 0 | 0 | 0 | 0 | 0 | 0 | 1 | 0 |
| 4 | LL | 53 | 0 | 1 | 0 | 0 | 0 | 0 | 0 | 0 | 1 | 0 | 1 | 0 | 1 | 0 | 0 | 0 |
| 4 |  | 54 | 0 | 0 | 0 | 1 | 0 | 0 | 0 | 0 | 0 | 0 | 1 | 0 | 1 | 0 | 1 | 0 |
| 4 |  | 55 | 0 | 0 | 0 | 0 | 0 | 1 | 0 | 1 | 0 | 0 | 0 | 0 | 1 | 0 | 1 | 0 |
| 4 |  | 56 | 0 | 0 | 0 | 0 | 0 | 0 | 0 | 1 | 1 | 0 | 1 | 0 | 0 | 0 | 1 | 0 |
| 4 | RL | 57 | 1 | 0 | 0 | 0 | 0 | 0 | 0 | 0 | 0 | 1 | 0 | 1 | 0 | 1 | 0 | 0 |
| 4 |  | 58 | 0 | 0 | 1 | 0 | 0 | 0 | 0 | 0 | 0 | 0 | 0 | 1 | 0 | 1 | 0 | 1 |
| 4 |  | 59 | 0 | 0 | 0 | 0 | 1 | 0 | 0 | 0 | 0 | 1 | 0 | 0 | 0 | 1 | 0 | 1 |
| 4 |  | 60 | 0 | 0 | 0 | 0 | 0 | 0 | 1 | 0 | 0 | 1 | 0 | 1 | 0 | 0 | 0 | 1 |
| 4 | AVE | 61 | 1 | 0 | 0 | 1 | 0 | 0 | 0 | 0 | 0 | 1 | 0 | 0 | 1 | 0 | 0 | 0 |
| 4 |  | 62 | 0 | 0 | 1 | 0 | 0 | 1 | 0 | 0 | 0 | 0 | 0 | 1 | 0 | 0 | 1 | 0 |
| 4 |  | 63 | 0 | 0 | 0 | 0 | 1 | 0 | 0 | 1 | 0 | 0 | 1 | 0 | 0 | 1 | 0 | 0 |
| 4 |  | 64 | 0 | 1 | 0 | 0 | 0 | 0 | 0 | 0 | 0 | 0 | 0 | 0 | 1 | 0 | 0 | 1 |
| 5 | LU | 65 | 1 | 0 | 1 | 0 | 1 | 0 | 0 | 1 | 0 | 1 | 0 | 0 | 0 | 0 | 0 | 0 |
| 5 |  | 66 | 0 | 1 | 1 | 0 | 1 | 0 | 1 | 0 | 0 | 0 | 0 | 1 | 0 | 0 | 0 | 0 |
| 5 |  | 67 | 1 | 0 | 0 | 1 | 1 | 0 | 1 | 0 | 0 | 0 | 0 | 0 | 0 | 1 | 0 | 0 |
| 5 |  | 68 | 1 | 0 | 1 | 0 | 0 | 1 | 1 | 0 | 0 | 0 | 0 | 0 | 0 | 0 | 0 | 1 |
| 5 | RU | 69 | 0 | 1 | 0 | 1 | 0 | 1 | 1 | 0 | 1 | 0 | 0 | 0 | 0 | 0 | 0 | 0 |
| 5 |  | 70 | 1 | 0 | 0 | 1 | 0 | 1 | 0 | 1 | 0 | 0 | 1 | 0 | 0 | 0 | 0 | 0 |
| 5 |  | 71 | 0 | 1 | 1 | 0 | 0 | 1 | 0 | 1 | 0 | 0 | 0 | 0 | 1 | 0 | 0 | 0 |
| 5 |  | 72 | 0 | 1 | 0 | 1 | 1 | 0 | 0 | 0 | 0 | 0 | 0 | 0 | 0 | 0 | 1 | 0 |
| 5 | LL | 73 | 0 | 1 | 0 | 0 | 0 | 0 | 0 | 0 | 1 | 0 | 1 | 0 | 1 | 0 | 0 | 1 |
| 5 |  | 74 | 0 | 0 | 0 | 1 | 0 | 0 | 0 | 0 | 0 | 1 | 1 | 0 | 1 | 0 | 1 | 0 |
| 5 |  | 75 | 0 | 0 | 0 | 0 | 0 | 1 | 0 | 0 | 1 | 0 | 0 | 1 | 1 | 0 | 1 | 0 |
| 5 |  | 76 | 0 | 0 | 0 | 0 | 0 | 0 | 1 | 1 | 0 | 1 | 1 | 0 | 0 | 1 | 1 | 0 |
| 5 | RL | 77 | 0 | 0 | 0 | 0 | 0 | 0 | 0 | 0 | 0 | 1 | 0 | 1 | 0 | 1 | 1 | 0 |
| 5 |  | 78 | 0 | 0 | 1 | 0 | 0 | 0 | 0 | 0 | 1 | 0 | 0 | 1 | 0 | 1 | 0 | 1 |
| 5 |  | 79 | 0 | 0 | 0 | 0 | 0 | 0 | 0 | 0 | 1 | 1 | 0 | 0 | 1 | 0 | 0 | 1 |
| 5 |  | 80 | 0 | 0 | 0 | 0 | 0 | 0 | 1 | 0 | 0 | 1 | 0 | 1 | 1 | 0 | 0 | 1 |
| 5 | AVE | 81 | 1 | 0 | 0 | 1 | 1 | 0 | 0 | 0 | 1 | 0 | 0 | 1 | 0 | 0 | 0 | 0 |
| 5 |  | 82 | 0 | 0 | 0 | 0 | 0 | 1 | 1 | 0 | 0 | 0 | 0 | 1 | 0 | 0 | 1 | 0 |
| 5 |  | 83 | 1 | 0 | 0 | 0 | 1 | 0 | 0 | 1 | 0 | 0 | 1 | 0 | 0 | 1 | 0 | 0 |
| 5 |  | 84 | 0 | 1 | 1 | 0 | 0 | 0 | 1 | 0 | 0 | 0 | 0 | 0 | 1 | 0 | 0 | 1 |
| 6 | LU | 85 | 1 | 0 | 1 | 0 | 1 | 0 | 0 | 1 | 0 | 1 | 1 | 0 | 0 | 0 | 0 | 0 |
| 6 |  | 86 | 0 | 1 | 1 | 0 | 1 | 0 | 1 | 0 | 0 | 0 | 0 | 1 | 1 | 0 | 0 | 0 |
| 6 |  | 87 | 1 | 0 | 0 | 1 | 1 | 0 | 1 | 0 | 0 | 0 | 0 | 0 | 0 | 1 | 1 | 0 |
| 6 |  | 88 | 1 | 0 | 1 | 0 | 0 | 1 | 1 | 0 | 1 | 0 | 0 | 0 | 0 | 0 | 0 | 1 |
| 6 | RU | 89 | 0 | 1 | 0 | 1 | 0 | 1 | 1 | 0 | 1 | 1 | 0 | 0 | 0 | 0 | 0 | 0 |
| 6 |  | 90 | 0 | 0 | 0 | 1 | 0 | 1 | 0 | 1 | 0 | 0 | 1 | 1 | 0 | 0 | 0 | 0 |
| 6 |  | 91 | 0 | 1 | 1 | 0 | 0 | 1 | 0 | 1 | 0 | 0 | 0 | 0 | 1 | 1 | 0 | 0 |
| 6 |  | 92 | 0 | 1 | 0 | 1 | 1 | 0 | 0 | 1 | 0 | 0 | 0 | 0 | 0 | 0 | 1 | 1 |
| 6 | LL | 93 | 0 | 1 | 1 | 0 | 0 | 0 | 0 | 0 | 1 | 0 | 1 | 0 | 1 | 0 | 0 | 1 |
| 6 |  | 94 | 0 | 0 | 0 | 1 | 1 | 0 | 0 | 0 | 1 | 1 | 0 | 1 | 0 | 1 | 0 | 1 |
| 6 |  | 95 | 0 | 0 | 0 | 0 | 0 | 1 | 1 | 0 | 1 | 0 | 0 | 1 | 1 | 0 | 1 | 0 |
| 6 |  | 96 | 1 | 0 | 0 | 0 | 0 | 0 | 1 | 1 | 0 | 1 | 0 | 0 | 1 | 1 | 0 | 0 |
| 6 | RL | 97 | 1 | 1 | 0 | 0 | 0 | 0 | 0 | 0 | 1 | 0 | 1 | 0 | 1 | 1 | 0 | 0 |
| 6 |  | 98 | 0 | 0 | 1 | 1 | 0 | 0 | 0 | 0 | 1 | 0 | 0 | 1 | 0 | 1 | 0 | 1 |
| 6 |  | 99 | 0 | 0 | 0 | 0 | 1 | 1 | 0 | 0 | 1 | 1 | 0 | 0 | 1 | 0 | 0 | 1 |
| 6 |  | 100 | 0 | 0 | 0 | 0 | 0 | 0 | 1 | 1 | 0 | 1 | 0 | 1 | 1 | 0 | 0 | 1 |
| 6 | AVE | 101 | 1 | 0 | 0 | 1 | 1 | 0 | 0 | 0 | 1 | 0 | 0 | 1 | 0 | 0 | 0 | 1 |
| 6 |  | 102 | 0 | 0 | 1 | 0 | 0 | 1 | 1 | 0 | 0 | 1 | 0 | 1 | 0 | 0 | 1 | 0 |
| 6 |  | 103 | 1 | 0 | 0 | 0 | 1 | 0 | 0 | 1 | 0 | 1 | 0 | 0 | 1 | 0 | 0 | 0 |
| 6 |  | 104 | 0 | 1 | 1 | 0 | 0 | 0 | 1 | 0 | 0 | 1 | 0 | 0 | 1 | 0 | 0 | 1 |

FIG. 5

L···LEFT  R···RIGHT

| GRAY SCALE VALUE | DENSITY GRADIENT INFORMATION | No. | a-1-1 L | a-1-1 R | a-2-1 L | a-2-1 R | a-3-1 L | a-3-1 R | a-4-1 L | a-4-1 R | b-1-1 L | b-1-1 R | b-2-1 L | b-2-1 R | b-3-1 L | b-3-1 R | b-4-1 L | b-4-1 R |
|---|---|---|---|---|---|---|---|---|---|---|---|---|---|---|---|---|---|---|
| 7 | LU | 105 | 1 | 0 | 1 | 0 | 1 | 0 | 1 | 1 | 0 | 1 | 1 | 0 | 0 | 0 | 0 | 0 |
| 7 |  | 106 | 1 | 1 | 1 | 0 | 1 | 0 | 1 | 0 | 0 | 0 | 0 | 1 | 1 | 0 | 0 | 0 |
| 7 |  | 107 | 1 | 0 | 1 | 1 | 1 | 0 | 1 | 0 | 0 | 0 | 0 | 0 | 0 | 1 | 1 | 0 |
| 7 |  | 108 | 1 | 0 | 1 | 0 | 1 | 1 | 1 | 0 | 1 | 0 | 0 | 0 | 0 | 0 | 0 | 1 |
| 7 | RU | 109 | 0 | 1 | 0 | 1 | 0 | 1 | 1 | 1 | 1 | 1 | 0 | 0 | 0 | 0 | 0 | 0 |
| 7 |  | 110 | 1 | 1 | 0 | 1 | 0 | 1 | 0 | 1 | 0 | 0 | 1 | 1 | 0 | 0 | 0 | 0 |
| 7 |  | 111 | 0 | 1 | 1 | 1 | 0 | 1 | 0 | 1 | 0 | 0 | 0 | 0 | 1 | 1 | 0 | 0 |
| 7 |  | 112 | 0 | 1 | 0 | 1 | 1 | 1 | 0 | 1 | 0 | 0 | 0 | 0 | 0 | 0 | 1 | 1 |
| 7 | LL | 113 | 0 | 1 | 1 | 0 | 0 | 0 | 0 | 0 | 1 | 0 | 1 | 0 | 1 | 0 | 1 | 1 |
| 7 |  | 114 | 0 | 0 | 0 | 1 | 1 | 0 | 0 | 0 | 1 | 1 | 1 | 0 | 1 | 0 | 1 | 0 |
| 7 |  | 115 | 0 | 0 | 0 | 0 | 0 | 1 | 1 | 0 | 1 | 0 | 1 | 1 | 1 | 0 | 1 | 0 |
| 7 |  | 116 | 1 | 0 | 0 | 0 | 0 | 0 | 0 | 1 | 1 | 0 | 1 | 0 | 1 | 1 | 1 | 0 |
| 7 | RL | 117 | 1 | 1 | 0 | 0 | 0 | 0 | 0 | 0 | 0 | 1 | 0 | 1 | 0 | 1 | 1 | 1 |
| 7 |  | 118 | 0 | 0 | 1 | 1 | 0 | 0 | 0 | 0 | 1 | 1 | 0 | 1 | 0 | 1 | 0 | 1 |
| 7 |  | 119 | 0 | 0 | 0 | 0 | 1 | 1 | 0 | 0 | 1 | 1 | 1 | 0 | 1 | 0 | 1 | 0 |
| 7 |  | 120 | 0 | 0 | 0 | 0 | 0 | 0 | 1 | 1 | 0 | 1 | 0 | 1 | 1 | 0 | 0 | 1 |
| 7 | AVE | 121 | 1 | 0 | 0 | 1 | 1 | 0 | 0 | 1 | 0 | 1 | 0 | 0 | 1 | 1 | 0 | 1 |
| 7 |  | 122 | 0 | 1 | 1 | 0 | 0 | 1 | 1 | 0 | 0 | 1 | 0 | 1 | 0 | 0 | 1 | 0 |
| 7 |  | 123 | 1 | 0 | 0 | 1 | 1 | 0 | 0 | 1 | 1 | 0 | 1 | 0 | 0 | 1 | 0 | 0 |
| 7 |  | 124 | 0 | 1 | 1 | 0 | 0 | 1 | 1 | 0 | 0 | 1 | 0 | 0 | 1 | 0 | 0 | 1 |
| 8 | LU | 125 | 1 | 0 | 1 | 0 | 1 | 0 | 1 | 1 | 0 | 1 | 1 | 0 | 1 | 0 | 0 | 0 |
| 8 |  | 126 | 1 | 1 | 1 | 0 | 1 | 0 | 1 | 0 | 0 | 0 | 0 | 1 | 1 | 0 | 1 | 0 |
| 8 |  | 127 | 1 | 0 | 1 | 1 | 1 | 0 | 1 | 0 | 1 | 0 | 0 | 0 | 0 | 1 | 0 | 0 |
| 8 |  | 128 | 1 | 0 | 1 | 0 | 1 | 1 | 1 | 0 | 1 | 0 | 1 | 0 | 0 | 0 | 0 | 1 |
| 8 | RU | 129 | 0 | 1 | 0 | 1 | 0 | 1 | 1 | 1 | 1 | 1 | 0 | 1 | 0 | 0 | 0 | 0 |
| 8 |  | 130 | 1 | 1 | 0 | 1 | 0 | 1 | 0 | 1 | 0 | 0 | 1 | 1 | 0 | 1 | 0 | 0 |
| 8 |  | 131 | 0 | 1 | 1 | 1 | 0 | 1 | 0 | 1 | 0 | 0 | 0 | 0 | 1 | 1 | 0 | 1 |
| 8 |  | 132 | 0 | 1 | 0 | 1 | 1 | 1 | 0 | 1 | 0 | 1 | 0 | 0 | 0 | 0 | 1 | 1 |
| 8 | LL | 133 | 0 | 1 | 1 | 0 | 1 | 0 | 0 | 0 | 1 | 0 | 1 | 0 | 1 | 0 | 1 | 1 |
| 8 |  | 134 | 0 | 0 | 0 | 1 | 1 | 0 | 1 | 0 | 1 | 1 | 1 | 0 | 1 | 0 | 1 | 0 |
| 8 |  | 135 | 1 | 0 | 0 | 0 | 0 | 1 | 1 | 0 | 1 | 0 | 1 | 1 | 1 | 0 | 1 | 0 |
| 8 |  | 136 | 1 | 0 | 1 | 0 | 0 | 0 | 0 | 1 | 1 | 0 | 1 | 0 | 1 | 1 | 1 | 0 |
| 8 | RL | 137 | 1 | 1 | 0 | 1 | 0 | 0 | 0 | 0 | 0 | 1 | 0 | 1 | 0 | 1 | 1 | 1 |
| 8 |  | 138 | 0 | 0 | 1 | 1 | 0 | 1 | 0 | 0 | 1 | 1 | 0 | 1 | 0 | 1 | 0 | 1 |
| 8 |  | 139 | 0 | 0 | 0 | 0 | 1 | 1 | 0 | 1 | 0 | 1 | 1 | 0 | 1 | 0 | 0 | 1 |
| 8 |  | 140 | 0 | 1 | 0 | 0 | 0 | 0 | 1 | 1 | 0 | 1 | 0 | 1 | 1 | 1 | 0 | 1 |
| 8 | AVE | 141 | 1 | 0 | 0 | 1 | 1 | 0 | 0 | 1 | 0 | 1 | 1 | 0 | 1 | 0 | 0 | 1 |
| 8 |  | 142 | 0 | 1 | 1 | 0 | 0 | 1 | 1 | 0 | 1 | 1 | 0 | 1 | 0 | 0 | 1 | 0 |
| 8 |  | 143 | 1 | 0 | 0 | 1 | 1 | 0 | 0 | 1 | 1 | 0 | 1 | 0 | 0 | 1 | 0 | 1 |
| 8 |  | 144 | 0 | 1 | 1 | 0 | 0 | 1 | 1 | 0 | 0 | 1 | 0 | 0 | 1 | 0 | 1 | 1 |

FIG. 12

| GRAY LEVEL | PATTERN 1 | | | | PATTERN 2 | | | | PATTERN 3 | | | |
|---|---|---|---|---|---|---|---|---|---|---|---|---|
| | UPPER LEFT | UPPER RIGHT | LOWER LEFT | LOWER RIGHT | UPPER LEFT | UPPER RIGHT | LOWER LEFT | LOWER RIGHT | UPPER LEFT | UPPER RIGHT | LOWER LEFT | LOWER RIGHT |
| 0 | 0 | 0 | 0 | 0 | 0 | 0 | 0 | 0 | 0 | 0 | 0 | 0 |
| 1 | 1 | 0 | 0 | 0 | 0 | 1 | 0 | 0 | 0 | 0 | 1 | 0 |
| 2 | 2 | 0 | 0 | 0 | 0 | 2 | 0 | 0 | 0 | 0 | 2 | 0 |
| 3 | 3 | 0 | 0 | 0 | 0 | 3 | 0 | 0 | 0 | 0 | 3 | 0 |
| 4 | 4 | 0 | 0 | 0 | 0 | 4 | 0 | 0 | 0 | 0 | 4 | 0 |
| 5 | 5 | 0 | 0 | 0 | 0 | 5 | 0 | 0 | 0 | 0 | 5 | 0 |
| 6 | 6 | 0 | 0 | 0 | 0 | 6 | 0 | 0 | 0 | 0 | 6 | 0 |
| 7 | 7 | 0 | 0 | 0 | 0 | 7 | 0 | 0 | 0 | 0 | 7 | 0 |
| 8 | 8 | 0 | 0 | 0 | 0 | 8 | 0 | 0 | 0 | 0 | 8 | 0 |
| 9 | 8 | 1 | 0 | 0 | 1 | 8 | 1 | 0 | 0 | 0 | 8 | 1 |
| 10 | 8 | 1 | 0 | 0 | 1 | 8 | 1 | 0 | 1 | 0 | 8 | 1 |
| 11 | 8 | 2 | 1 | 0 | 2 | 8 | 1 | 0 | 1 | 0 | 8 | 2 |
| 12 | 8 | 2 | 2 | 0 | 2 | 8 | 2 | 0 | 2 | 0 | 8 | 2 |
| 13 | 8 | 2 | 2 | 1 | 2 | 8 | 2 | 1 | 2 | 1 | 8 | 2 |
| 14 | 8 | 2 | 2 | 2 | 2 | 8 | 2 | 2 | 2 | 2 | 8 | 2 |
| 15 | 8 | 3 | 3 | 2 | 3 | 8 | 3 | 2 | 3 | 2 | 8 | 3 |

| GRAY LEVEL | PATTERN 4 | | | | | | | | PATTERN 5 | | | |
|---|---|---|---|---|---|---|---|---|---|---|---|---|
| | UPPER LEFT | UPPER RIGHT | LOWER LEFT | LOWER RIGHT | | | | | UPPER LEFT | UPPER RIGHT | LOWER LEFT | LOWER RIGHT |
| 0 | 0 | 0 | 0 | 0 | | | | | 0 | 0 | 0 | 0 |
| 1 | 0 | 0 | 0 | 1 | | | | | 1 | 0 | 0 | 0 |
| 2 | 0 | 0 | 0 | 2 | | | | | 1 | 0 | 0 | 1 |
| 3 | 0 | 0 | 0 | 3 | | | | | 1 | 1 | 0 | 1 |
| 4 | 0 | 0 | 0 | 4 | | | | | 1 | 1 | 1 | 1 |
| 5 | 0 | 0 | 0 | 5 | | | | | 2 | 1 | 1 | 1 |
| 6 | 0 | 0 | 0 | 6 | | | | | 2 | 1 | 1 | 2 |
| 7 | 0 | 0 | 0 | 7 | | | | | 2 | 2 | 1 | 2 |
| 8 | 0 | 0 | 0 | 8 | | | | | 2 | 2 | 2 | 2 |
| 9 | 0 | 0 | 1 | 8 | | | | | 3 | 2 | 2 | 2 |
| 10 | 0 | 0 | 1 | 8 | | | | | 3 | 2 | 2 | 3 |
| 11 | 0 | 1 | 2 | 8 | | | | | 3 | 3 | 2 | 3 |
| 12 | 0 | 2 | 2 | 8 | | | | | 3 | 3 | 3 | 3 |
| 13 | 1 | 2 | 2 | 8 | | | | | 4 | 3 | 3 | 3 |
| 14 | 2 | 2 | 2 | 8 | | | | | 4 | 3 | 3 | 4 |
| 15 | 3 | 3 | 3 | 8 | | | | | 4 | 4 | 4 | 4 |

FIG. 13

| GRAY SCALE VALUE | A INK | B INK | C INK | D INK |
|---|---|---|---|---|
| 0 | 0 | 0 | 0 | 0 |
| 1 | 1 | 0 | 0 | 0 |
| 2 | 2 | 0 | 0 | 0 |
| 2 | 0 | 1 | 0 | 0 |
| 3 | 3 | 0 | 0 | 0 |
| 3 | 1 | 1 | 0 | 0 |
| 4 | 4 | 0 | 0 | 0 |
| 4 | 2 | 1 | 0 | 0 |
| 4 | 0 | 2 | 0 | 0 |
| 4 | 0 | 0 | 1 | 0 |
| 5 | 3 | 1 | 0 | 0 |
| 5 | 1 | 2 | 0 | 0 |
| 5 | 1 | 0 | 1 | 0 |
| 6 | 2 | 2 | 0 | 0 |
| 6 | 0 | 3 | 0 | 0 |
| 6 | 2 | 0 | 1 | 0 |
| 6 | 0 | 1 | 1 | 0 |
| 7 | 1 | 3 | 0 | 0 |
| 7 | 1 | 1 | 1 | 0 |
| 8 | 0 | 4 | 0 | 0 |
| 8 | 0 | 0 | 2 | 0 |
| 8 | 0 | 0 | 0 | 1 |

INK-JET PRINTING APPARATUS AND METHOD, AND COMPUTER READABLE MEMORY

FIELD OF THE INVENTION

The present invention relates to an ink-jet printing apparatus and method for printing a desired visible image by forming ink dots on a print medium by discharged ink droplets, and a computer readable memory.

BACKGROUND OF THE INVENTION

Conventionally, as information processing apparatuses, such as a copying machine, wordprocessor, computer, and the like, and communication apparatuses have prevailed and advanced, an apparatus for printing a digital image using an ink-jet print head has increasingly become prevalent as one of image forming (printing) apparatuses for those apparatuses. Also, since the aforementioned information processing apparatuses and communication apparatuses adopt high-quality, color graphic information, a printing apparatus is required to output a high-quality, color image.

Such printing apparatus uses a print head which comprises a print element array prepared by integrating and lining up a plurality of print elements, and on which a plurality of ink ejection ports and ink channels are integrated at high density, so as to miniaturize pixels. Furthermore, to obtain color outputs, the printing apparatus normally comprises a plurality of print heads corresponding to, e.g., cyan, magenta, yellow, and black inks.

However, high-density integration of the ink ejection ports and ink channels is limited and, hence, miniaturization of pixels has a given limit. In such case, since dots that form each pixel become relatively large, they give rise to graininess in a low-density image highlight portion or the like, and disturb improvement of the image quality of an image.

By contrast, a so-called multi-drop scheme is known. In this scheme, in place of increasing the integration density of ink ejection ports and ink channels (i.e., in place of reducing one pixel size), the dot size of ink to be discharged is reduced and one pixel is formed by ink droplets corresponding in number to a print density. With the multi-drop scheme, since the ink dot size printed on a print sheet can become relatively small, graininess in a low-density portion such as a highlight portion or the like can be eliminated.

However, miniaturization of the ink droplet size is limited in consideration of ejection stability upon discharging small ink droplets, and bottlenecks the improvement of image quality accordingly. In this scheme, since the number of ink droplets to be discharged per pixel increases, the print speed lowers, and conflict between high image quality and high print speed occurs.

As another scheme for improving image quality without increasing the integration density of ink ejection ports, a multi-density printing scheme using multi-density (dark and light) inks of the same hue having different ink densities is known. In this scheme, a highlight portion is printed using low-density light ink to reduce graininess of ink dots, and a high-density portion is printed using dark ink. Since this scheme need not increase the number of ink droplets to be discharged upon forming a high-density portion unlike in the multi-drop scheme, an increase in print ink droplet amount and a decrease in print speed can be suppressed.

Furthermore, in this multi-density printing scheme, inks used to express an output image density corresponding to an input image density are determined using a multi-density ink distribution table (ink distribution table) shown in, e.g., FIG. 13. FIG. 13 shows an example of the contents of the multi-density ink distribution table using four types of multi-density inks. (Optical densities of A–D inks are 1:2:4:8, A and B inks are light inks and C and D inks are dark inks.) FIG. 14 is a flow chart showing the flow of an image process using the ink distribution table shown in FIG. 13.

The multi-density printing scheme rasterizes an input image in correspondence with individual inks using the multi-density ink distribution table based on the input image density. That is, in FIG. 14 an image is input (step S11), and undergoes a multi-valued process (step S12). Multi-density inks to be used are determined for the processed image using the multi-density ink distribution table (step S13).

After the multi-density inks used are determined, data is binarized by a binarization circuit (step S14) to generate drive signals for print element arrays a to d corresponding to inks A, B, C, and D (steps S15 to S18). In an image printed by such process, a low-density region such as an image highlight portion or the like is printed using light ink to reduce graininess of ink dots, and a high-density portion is printed using light and dark inks. In this way, the image quality can be improved.

In addition to grayscale expression in each pixel using a plurality of types of multi-density inks, grayscale expression based on dot size modulation by modulating the dot size of ink used in a print process is done. Note that the grayscale expression based on dot size modulation and that using multi-density inks are normally combined with the multi-drop scheme or pseudo halftoning rather than they are used alone.

As pseudo halftoning, dithering, error diffusion, average density preservation, and the like is known. Dithering binarizes each pixel data using threshold values for respective pixels determined by a dither matrix.

Error diffusion binarizes multi-valued image data of a pixel of interest (converts it into the darkest or lightest level), and distributes and adds the difference (error) between the converted binary level and the value before binarization to surrounding pixels, as described in, e.g., R. FLOYD & L. STEINBERG, "AN ADAPTIVE ALGORITHM FOR SPATIAL GRAY SCALE", SID 75 DIGEST, pp. 36–37.

Average density preservation obtains a threshold value on the basis of the already binarized binary data around the pixel of interest or values containing the binarization result of the pixel of interest to black or white, and binarizes image data of the pixel of interest using that threshold value, as described in, e.g., Japanese Patent Laid-Open No. 2-210962.

Furthermore, in addition to these methods, for example, when a transparent image of a medical X-ray film or the like is to be output, the resolution of vision with respect to density increases since it is a transparent image. As a result, even when the multi-density inks are used, the density differences for respective pixels are recognized, and an image may look coarse. In such case, the number of gray levels per pixel must be increased, and that requirement can be met by increasing the number of multi-density inks.

In the aforementioned ink-jet printing method, a multi-pass printing method is prevalently used. A multi-pass printing method using multi-density inks (described in, e.g., Japanese Patent Laid-Open No. 7-47698) forms an ink dot by controlling a plurality of ink droplets discharged from a plurality of print elements of a print head to land on substantially a single pixel, and expresses the gray level of that pixel by appropriately combining the number of ink droplets, and dark and light inks.

However, along with advance of the print technology, an input image to be processed has higher definition, and it is required to reproduce finer representation on a print medium. For this reason, both the input and output signals occupy huge capacity on a memory that stores these signals. In consideration of such situation, the conventional image printing method suffers the following problems.

(1) Ink discharged from a print head may deviate from a predetermined landing position due to nonuniformity of the shape of each ink ejection port of a print head and the surface state of a discharge surface. This phenomenon is normally called "kink". Especially, when a given gray level is printed over a predetermined area or more, and such image is formed to contain at least ink dots discharged from an identical print element, deviation of the landing position due to "kink" is recognized as so-called "stripes" having periodicity, thus deteriorating image quality.

In order to eliminate the influences of "kink", the aforementioned multi-pass printing method is used. For example, the periodicity of "kink" may be changed or distributed using a higher-order multi-pass printing method. However, printing by the higher-order multi-pass printing method requires a longer print time. Hence, "stripes" cannot be effectively reduced by a fewer number of passes.

(2) When a given print element does not eject any ink droplet over a predetermined area or more, an ink droplet the print element discharges first in that scan may form an ink dot different from that formed when the print element continuously discharges ink, due to a change in state of the ink ejection port of that print element. In this manner, a pixel having a gray level locally different from that to be printed may be generated in an image. This phenomenon tends to appear especially in low-density ink, and readily occurs in the multi-density ink printing method in this sense.

(3) The print head of an ink-jet printing apparatus cannot be permanently used, and may influence the print quality if it damages or stains. For this reason, the print head is exchanged. In this case, it is preferable to obtain equivalent printouts by print heads before and after the exchange. That is, print heads having different characteristics before and after the exchange may change image quality.

(4) When an input image is high-definition, high-resolution information, a gray level that a unit pixel can reproduce is limited. For this reason, upon printing that high-resolution image while its information size remains the same, pseudo halftoning is done. This process is time-consuming.

(5) The print speed can be improved by decimating pixels of an input image, but then the image quality drops.

SUMMARY OF THE INVENTION

The present invention has been made in consideration of the aforementioned problems, and has as its object to provide an ink-jet printing apparatus and method, which can print a high-definition input image having huge image information at high speed without deteriorating its image quality, and a computer readable memory.

According to the present invention, the foregoing object is attained by providing an ink-jet printing apparatus for printing a visible image on a print medium by discharging ink from a plurality of ink ejection print elements, comprising means for storing a first table indicating a correspondence between a plurality of inks and gray scale values of print pixels, means for storing a second table indicating combinations of density distribution patterns of print pixels and the ink ejection print elements in correspondence with the gray scale values, designation means for designating a region consisting of a predetermined number of neighboring pixels from pixels that form an input image, selection means for selecting the pixel density distribution pattern for the designated region, and control means for controlling ink ejection/non-ejection of ink from the plurality of ink ejection print elements by looking up the first and second tables in accordance with the pixel density distribution pattern and a gray scale value thereof.

According to the present invention, the foregoing object is attained by providing an ink-jet printing method for printing a visible image on a print medium by discharging ink from a plurality of ink ejection print elements, comprising a designation step of designating a region consisting of a predetermined number of neighboring pixels from pixels that form an input image, a selection step of selecting a pixel density distribution pattern for the designated region, and a control step of controlling ink ejection/non-ejection of ink from the plurality of ink ejection print elements by looking up a first table indicating a correspondence between a plurality of inks and gray scale values of print pixels and a second table indicating combinations of density distribution patterns of print pixels and the ink ejection print elements in correspondence with the gray scale values in accordance with the pixel density distribution pattern and a gray scale value thereof.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 shows a print element combination table according to the embodiment of the present invention;

FIG. 4 shows the print element combination table according to the embodiment of the present invention;

FIG. 5 shows the print element combination table according to the embodiment of the present invention;

FIG. 12 shows an example of a print ink combination table;

FIG. 13 shows the contents of a multi-density ink combination table using two different multi-density inks (dark and light inks)

DESCRIPTION OF THE PREFERRED EMBODIMENTS

Figure 1:
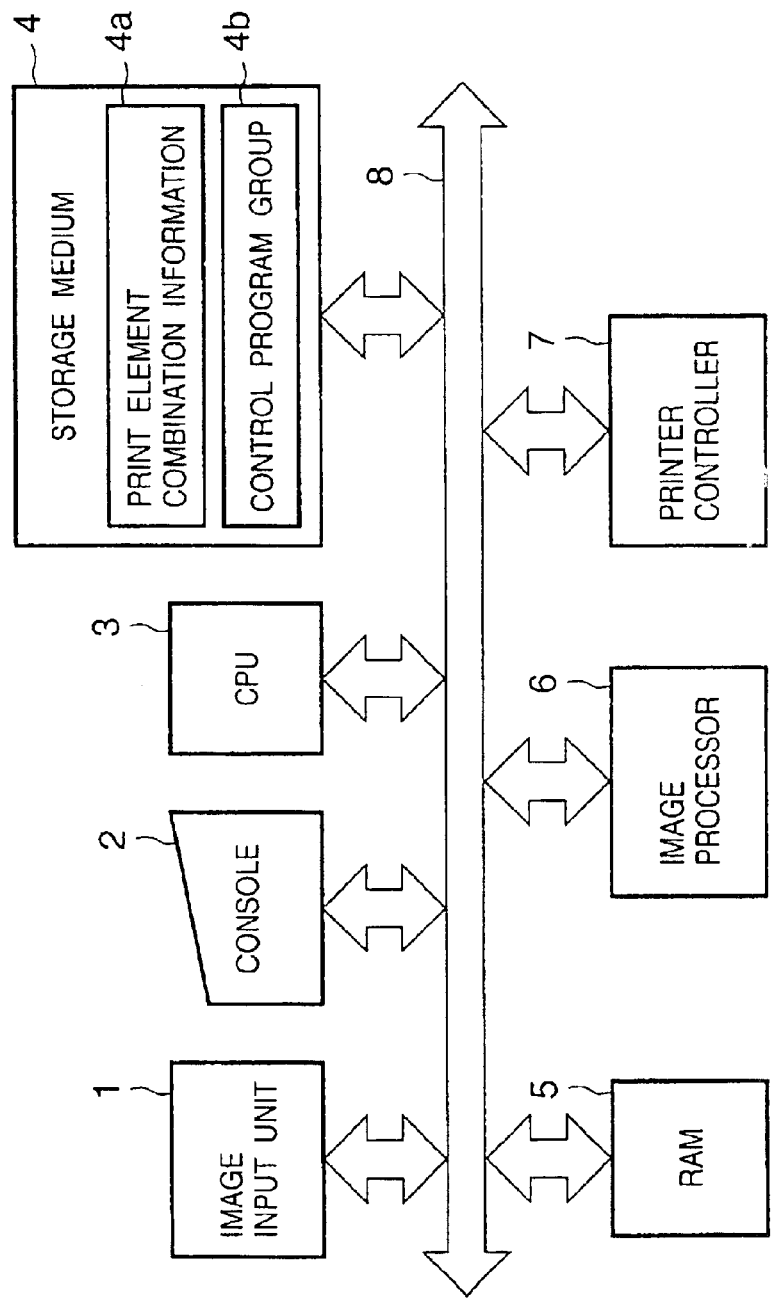
FIG. 1 is a block diagram showing the arrangement of an ink-jet printing apparatus according to an embodiment of the present invention.

A preferred embodiment of the present invention will be described in detail hereinafter with reference to the accompanying drawings. Note that "density" hereinafter means an optical density of ink landed on a printing medium. Further, "multi-density" ink means that there are different optical densities of inks.

<Relationship Between Image Print Process and Multi-Density Inks>

In general, an image has a gray level for each pixel, and a desired image is printed and reproduced using a unit pixel (a minimum unit that forms a print pixel and differs depending on image printing apparatuses) which prints that gray level.

For example, an image printing apparatus which can control 16 ink droplets to land on a unit pixel can print 16+1 (blank paper) gray levels on the unit pixel. At this time, if inks having two different densities can be prepared, the number of gray levels that can be reproduced becomes 32 or more although it depends on the density ratio of inks.

On the other hand, if two different ink droplet volumes can be prepared, the number of gray levels can be increased as in the ink density, and if different ink densities and ink droplet volumes are combined, the number of gray levels that can be reproduced on one unit pixel can exceed 256.

For example, when n different multi-density inks are used, if one pixel is formed by one dot alone, the number of combinations of the numbers of dots formed by respective multi-density inks (to be referred to as "multi-density combinations" hereinafter) is $_nC_1=n$ upon selecting only one out of n different multi-density inks. On the other hand, if one pixel is formed by two dots, $_nC_2=n(n-1)/2$ combinations upon selecting two out of n different multi-density inks and forming one dot by each ink, and $_nC_1=n$ combinations upon selecting one out of n different multi-density inks and forming two dots by that ink are available.

More specifically, the number of multi-density combinations increases with increasing number of dots that can be formed per pixel, and with increasing number of types of multi-density inks used. Also, many multi-density combinations produce substantially the same gray levels depending on the density ratio of multi-density inks used. Furthermore, in addition to the number of types of multi-density inks, when several different multi-size dots are formed by ink droplets having different volumes, the number of combinations further increases.

The number of ink dots that can form a unit pixel depends on the characteristics of a print medium, the ejection volume of ink, and the like, and is limited in terms of the print speed and print system. In general, that number of ink dots assumes a value of around 30 to 600 ng/300-dpi pixel in the weight or volume of an ink droplet.

When the image to be printed has a high resolution or a large number of gray levels, the input image size becomes large, and both the host that processes an image to be printed (e.g., transfers the image to the printing apparatus) and the printing apparatus require much time. Hence, in the present invention, for example, four (2×2) pixels of an input image are considered as one pixel. As a result, the information size of the input image is reduced to ¼, and the time required to print can be consequently shortened. Note that an input image is reduced in resolution since 2×2 pixels of the input image are considered as one pixel, but a solution to this problem will be explained later.

Figure 8:
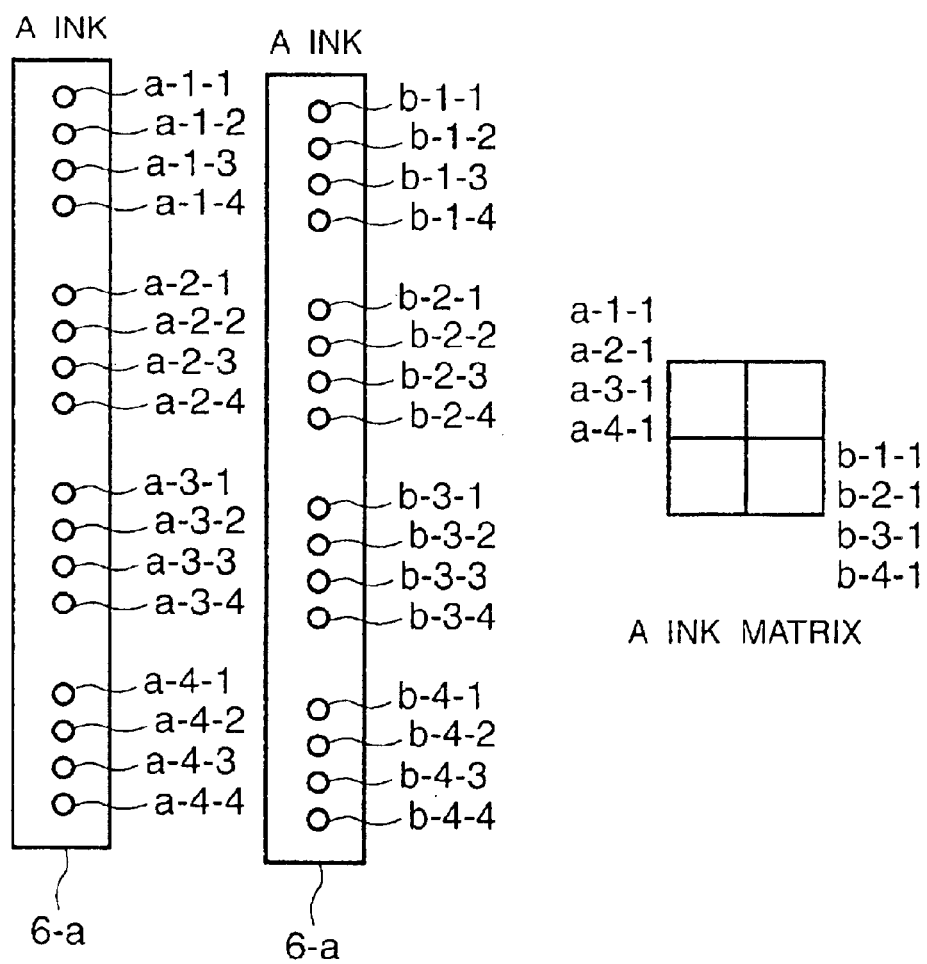
FIG. 8 shows ink-jet print element arrays in each of which 16 print elements line up in the main scan direction.

On the other hand, when a print element array prepared by integrating and lining up a plurality of print elements is used, print elements that can print an identical pixel on a print medium upon executing, for example, 4-pass print processes using an ink-jet print element array in which 16 print elements are set in the main scan direction, as shown in FIG. 8, can be selected from a total of four print elements a-1-1, a-2-1, a-3-1, and a-4-1 of the print element array shown in FIG. 8.

As described above, in the print method for forming a plurality of ink dots in a single pixel, if the print element array shown in FIG. 8 is taken as an example, and two ink dots are printed in a single pixel, $_4C_2=6$ different combinations are available.

Furthermore, when a plurality of multi-density inks are used, and when a print element array that discharges a plurality of ink droplets with an identical density is used, and print elements eject ink with different ink droplet volumes to form multi-size dots, the aforementioned number of combinations increases. For example, when a combination of multi-density inks, in which the optical density of dark ink on a print medium exhibits a density substantially twice that of light ink, and a combination of dot sizes in which the large dot volume is nearly twice the small dot volume are used, the following combinations are available.

Figure 9:
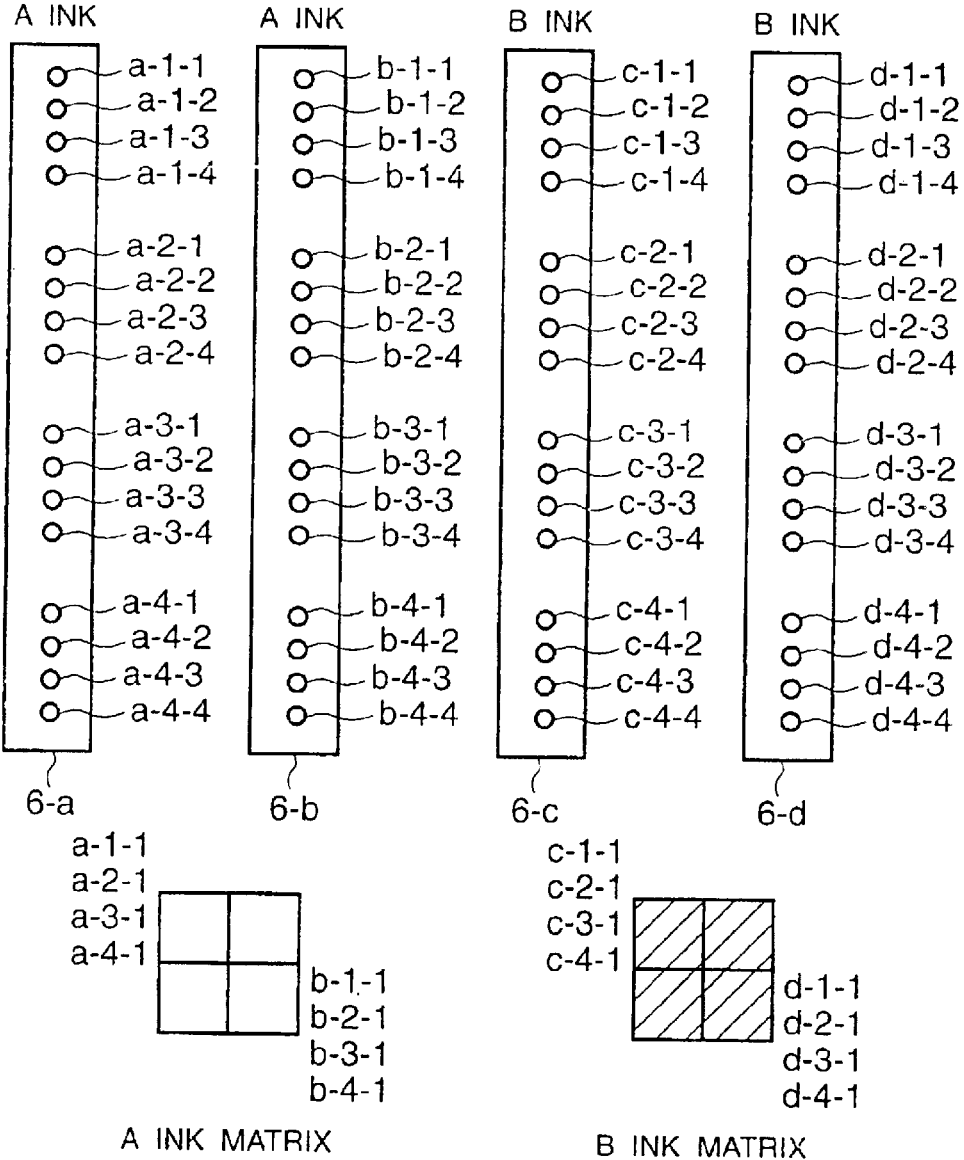
FIG. 9 shows ink-jet print element arrays including print element arrays capable of printing multi-size dots of light ink, and those capable of printing multi-size dots of dark ink.

FIG. 9 shows ink-jet print element arrays including print element arrays (6-a, 6-b) capable of printing multi-size dots of light ink (ink A), and print element arrays capable of printing multi-size dots of dark ink (ink B). When the maximum number of ink droplets that can practically land on a single pixel is limited to two for each of multi-size dots, many combinations of gray levels can be expressed.

In consideration of combinations of print elements used to print a given pixel, for example, when a print element array passes over a print pixel four times upon reproducing a given gray scale value, many combinations of passes and ink dots to be printed are available. In the present invention, combinations of nozzles to be driven are stored as tables (print element combination tables: second tables), and a combination is selected in accordance with each input image.

By systematically managing the number of dots printed by multi-density inks and the print elements used to print by the many print element combination tables, a combination of a series of print elements to be used actually is selected.

Since the number of selectable combinations becomes huge with increasing number of types of ink densities, number of types of ink droplet volumes, and number of passes of the multi-pass print control, a limited number of print element combination tables are preferably stored in practice, thus contributing to a high-speed image print process.

Figure 11:
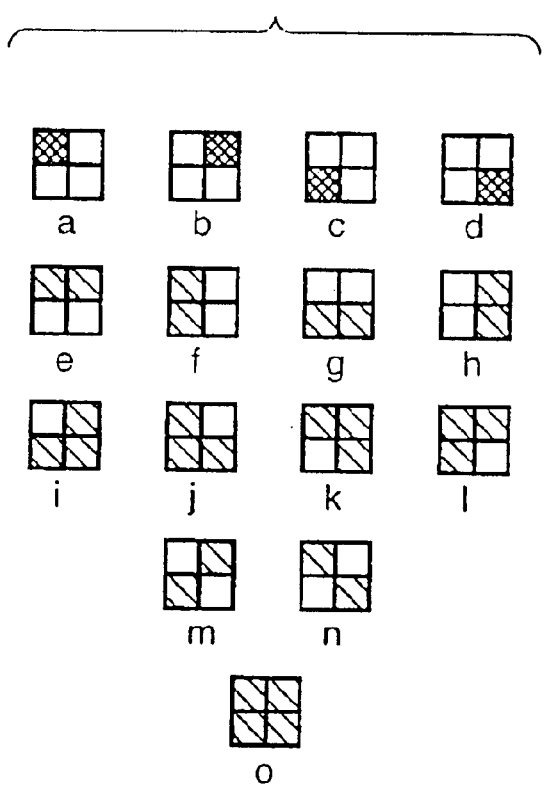
FIG. 11 shows an example of combination patterns of print elements.
Figure 14:
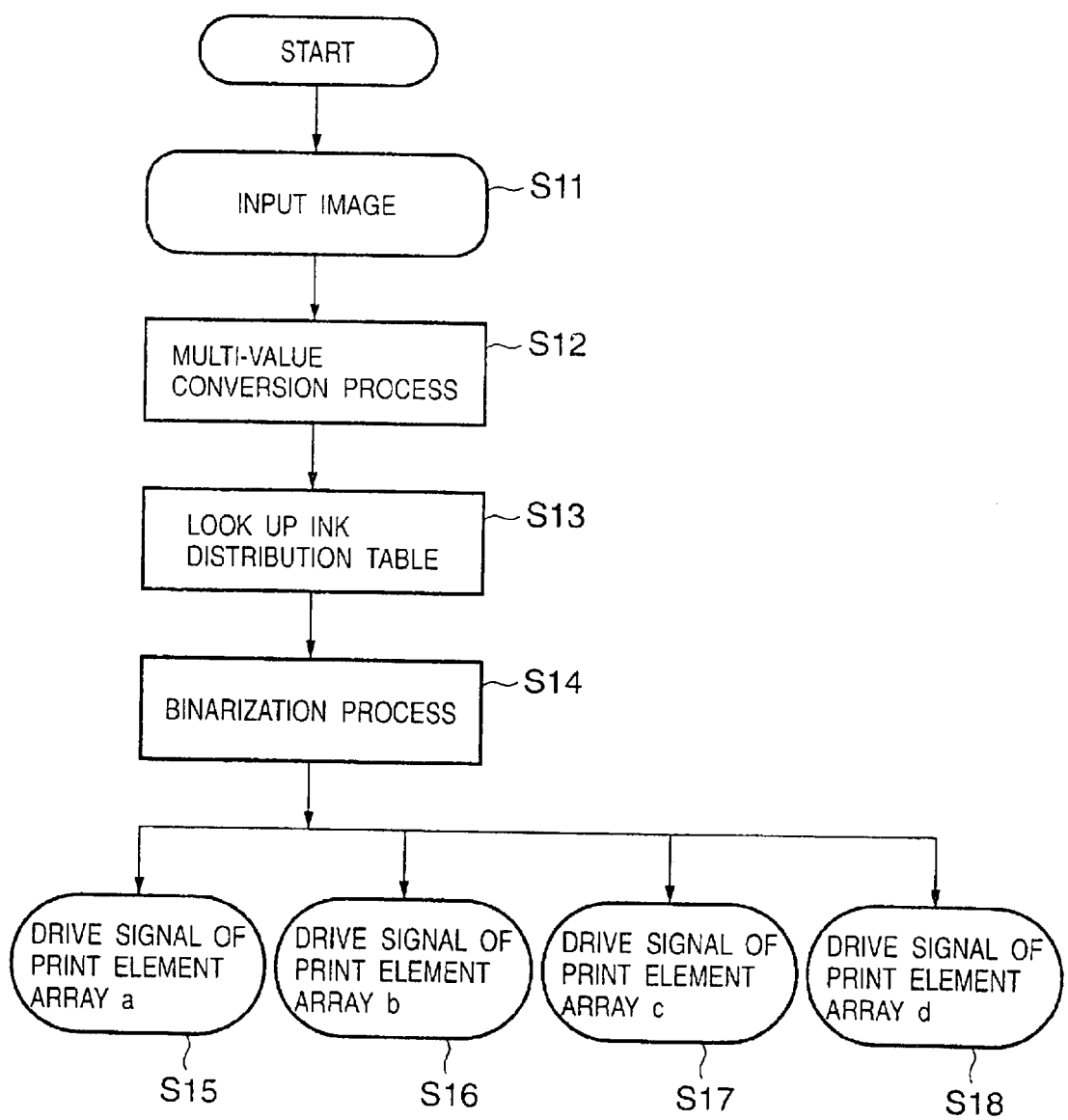
FIG. 14 is a flow chart showing the flow of an image process using an ink distribution table shown in FIG. 13.

FIG. 11 shows an example of combination patterns of print elements stored in this way. As can be seen from patterns a to o in FIG. 11, even when an identical gray scale value is printed within 2×2 pixels, the printed gray scale value varies depending on unit pixels. Such variation is called a density distribution in a print pixel (density distribution pattern of a print pixel).

The density distribution in a print pixel is stored in the aforementioned print ink combination table (first table) as classes (density gradient information) a to o shown in, e.g., FIG. 11. FIG. 12 shows an example of a print ink combination table (first table) generated in this way, which stores five patterns (patterns 1 to 5) for the sake of simplicity. Numerical values shown in FIG. 12 indicate the numbers of ink droplets to be printed in a unit pixel upon forming respective patterns when a maximum of 16 ink droplets are printed in 2×2 print pixels.

When a pattern to be used is selected from the print ink combination table on the basis of the pixel value of an input image, the gray scale value of a unit pixel of the input image cannot often match that of a unit pixel of a print image depending on the combination table used. However, although the gray scale value varies slightly, image data can be rasterized while reducing the information size of the input image, and an image can be printed without sacrificing the resolution.

Note that a method of selecting a pattern of the print ink combination table on the basis of the gray scale value of a pixel of an input image is not particularly limited. For example, the following method may be used.

When the gray scale value and average of the unit pixel of interest (e.g., the upper left pixel of 2×2 pixels) are separated a predetermined value or more from the total and average of the 2×2 pixels of an input image, a pattern according to the feature of the four (=2×2) pixels is selected. However, when the gray level and average of the unit pixel of interest are not separated by the predetermined value or more, it is estimated that other three pixels are not separated either.

The gray scale value and print element combination used are determined for each pixel from a series of print element combination patterns selected in this way on the basis of an input image. If there are a plurality of combinations of gray scale values, patterns, and print element combinations, which exhibit substantially the same density, are present, for example, if three different combinations A, B, and C produce substantially the same gray scale value, three different print element combinations are sequentially used for respectively pixels like ABCABCABC, . . . upon expressing that gray scale value.

Alternatively, it is preferable to randomly use these three different print element combinations like ABCCBABBCAA, . . . Note that this random selection method is not particularly limited.

<Description of Ink-Jet Printing Method>

Any of known ink-jet printing methods that print by discharging small ink droplets via nozzles by exploiting various drive principles can be applied to an image printing apparatus (ink-jet printing apparatus) according to this embodiment. For example, an ink-jet method that discharges ink from a nozzle by an abrupt change in volume of ink caused by applying heat energy to the ink (Japanese Patent Laid-Open No. 54-59936) can be applied.

Figure 2:
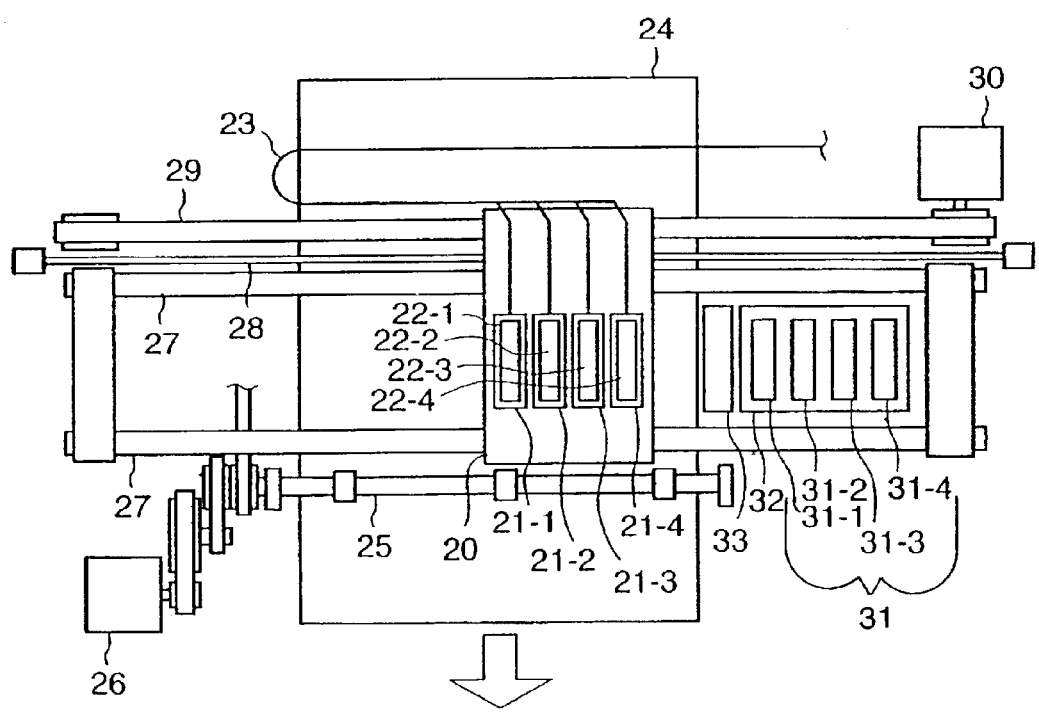
FIG. 2 is a view showing the arrangement of a printer unit of the ink-jet printing apparatus according to the embodiment of the present invention.

An ink-jet printing apparatus that can suitably adopt that ink-jet printing method will be explained below. FIG. 2 shows the arrangement of a printer unit of the ink-jet printing apparatus according to this embodiment.

A plurality of ink-jet units 21-1 to 21-4 are mounted on a carriage 20 of the ink-jet printing apparatus shown in FIG. 2. These ink-jet units have print element arrays for discharging ink, which are set at a predetermined spacing. Ink cartridges 22-1, 22-2, 22-3, and 22-4 supply inks to the corresponding print element arrays of the ink-jet units 21-1 to 21-4. Of these ink cartridges, the ink cartridges 22-1 and 22-3 supply light ink, and the ink cartridges 22-2 and 22-4 supply dark ink. Note that the respective densities will be explained later.

Control signals and the like are sent to the ink-jet units 21-1 to 21-4 via a flexible cable 23. A print sheet 24 such as a paper sheet, plastic thin plate, or the like is clamped by a discharge roller 25 via a feed roller (not shown), and is fed in the direction of an arrow in FIG. 2 upon driving a feed motor 26.

The carriage 20 is guided and supported by a guide shaft 27 and linear encoder 28. The carriage 20 reciprocally moves along the guide shaft 27 via a drive belt 29 by driving a carriage motor 30. Heating elements for producing heat energy for ink ejection (electrothermal energy converters) are provided inside (ink channels of) the ink ejection ports of the ink-jet units 21-1 to 21-4.

The aforementioned print elements are driven based on a predetermined print signal in accordance with the read timing of the linear encoder 28, and form an image by making ink droplets fly and become attached onto the print sheet 24.

A recovery unit 32 having a cap unit 31 is set at the home position of the carriage 20, which is set outside the print region. While the print process halts, the carriage 20 moves to the home position, and caps 31-1 to 31-4 of the cap unit 31 cap the ink ejection port surfaces of the corresponding ink-jet units 21, thus preventing ink from drying due to evaporation of an ink solvent or clogging due to attachment of foreign matter such as dust or the like.

The capping function of the cap unit 31 is used in idle ejection for discharging ink toward the cap unit separated from the ink ejection ports so as to eliminate ejection errors and clogging of the ink ejection ports which print less frequently, and in ejection recovery of ejection ports that have caused ejection errors by drawing ink by suction therefrom by activating a pump (not shown) while being capped.

An ink pan 33 receives ink preliminarily discharged by the ink-jet units 21-1 to 21-4 when they pass above the ink pan 33 immediately before an actual print process. When a blade or cleaning member (not shown) is arranged at a neighboring position of the cap unit, the ink ejection port formation surfaces of the ink-jet units 21-1 to 21-4 can be cleaned.

In this ink-jet printing apparatus, two print heads having print element arrays for each of two, light and dark inks are juxtaposed laterally on the ink-jet units 21-1 to 21-4. However, the present invention is not limited to such specific arrangement, and the print heads may be divided not laterally but vertically. Furthermore, in place of arranging the print element arrays laterally, one print element array may be vertically divided into four subarrays.

A color print process can be attained by mounting print heads that respectively store black, cyan, magenta, and yellow inks on the carriage. Furthermore, a plurality of multi-density inks and multi-size dots may be used for each color.

<Arrangement of Ink-Jet Printing Apparatus>

The arrangement and operation of the ink-jet printing apparatus according to this embodiment will be described below. A case will be explained below wherein a 600-dpi, high-definition, 256-level monochrome medical X-ray transparent image is formed using black ink under the condition that a maximum of four ink droplets can land per unit pixel, one print pixel is formed by four (=2×2) unit pixels, and a maximum of eight ink droplets can land within the print pixel.

FIG. 1 is a block diagram showing the arrangement of the ink-jet printing apparatus according to this embodiment.

Referring to FIG. 1, reference numeral 1 denotes an image input unit; 2, a console; 3, a central processing unit (CPU) for making various processes; and 4, a storage medium for storing various data. The storage medium 4 stores print element combination information 4a in the form of a table, and various control programs 4b. Reference numeral 5 denotes a RAM; 6, an image processor; 7, a printer controller for making image output control; and 8, a bus (bus line) for interconnecting the respective building components and transferring various data.

The image input unit 1 comprises, e.g., a scanner, digital camera, or the like. The console 2 comprises various keys used to set various parameters, and to instruct the start of a print process. The CPU 3 controls the overall ink-jet printing apparatus of this embodiment in accordance with various programs in the storage medium 4.

The storage medium 4 stores programs for making the ink-jet printing apparatus operate in accordance with a control program, an error processing program, and the like. All the operations of this ink-jet printing apparatus are implemented by those programs. As the storage medium 4 that stores the programs, for example, a ROM, FD, CD-ROM, HD, memory card, magnetooptical disk, or the like can be used.

The RAM 5 is used as a work area for various programs in the storage medium 4, a temporary save area in an error process, and a work area in an image process. Also, after various tables in the storage medium 4 are copied to the RAM 5, the contents of these tables may be changed, and a predetermined image process may be executed by looking up the changed tables.

The image processor 6 generates a discharge pattern that implements multi-level expression by the ink-jet method on the basis of an input image. The printer controller 7 forms a dot image on the basis of the ejection pattern generated by the image processor 6 upon printing an image. The bus line 8 interconnects the building components, and transfers an address signal, data, control signal, and the like in the ink-jet printing apparatus.

The aforementioned print element combination information 4a stores data that pertains to inks used. The ink used in this embodiment is one type. However, as will be described later, light and dark inks may be prepared for the purpose of printing ink dots of the same hue having different densities, and are effective to reproduce many gray scale values.

Note that the ink is comprised of a color agent (dye and/or pigment) and a solvent, which contains various additives such as a surfactant, humectant, and the like. These additives control ejection characteristics from the print heads and absorption characteristics on a print sheet.

When one unit pixel is formed by a maximum of four ink dots using such ink, many print ink combination tables that can express a print pixel consisting of 4 (=2×2) unit pixels are available. In this embodiment, of these tables, a total of 144+1 print ink combination tables (a total of five different patterns including four patterns having high density offsets respectively at the upper left, upper right, lower left, and lower right pixel positions in a 2×2 pattern, and an offset-less pattern for respective gray scale values, and (8+1) values for respective print pixels) are used.

FIGS. 3 to 5 show the print ink combination table (second table) according to this embodiment.

Of numerical values in FIGS. 3 to 5, "1" indicates ejection of an ink droplet; "0", non-ejection of an ink droplet. For the sake of simplicity, as information associated with the positions in a 2×2 matrix, LU, RU, LL, and RL respectively indicate upper left, upper right, lower left, and lower right pixels, and a group of ink combination tables in each of which a given unit pixel has a higher density offset than other unit pixel is expressed as density patterns.

The density level is not perfectly proportional to the total of the number of inks discharged per pixel, and the pigment content of ink, but no practical problem is posed for a low-density portion of a reflecting print medium or transparent print medium if so assumed.

Figure 6:
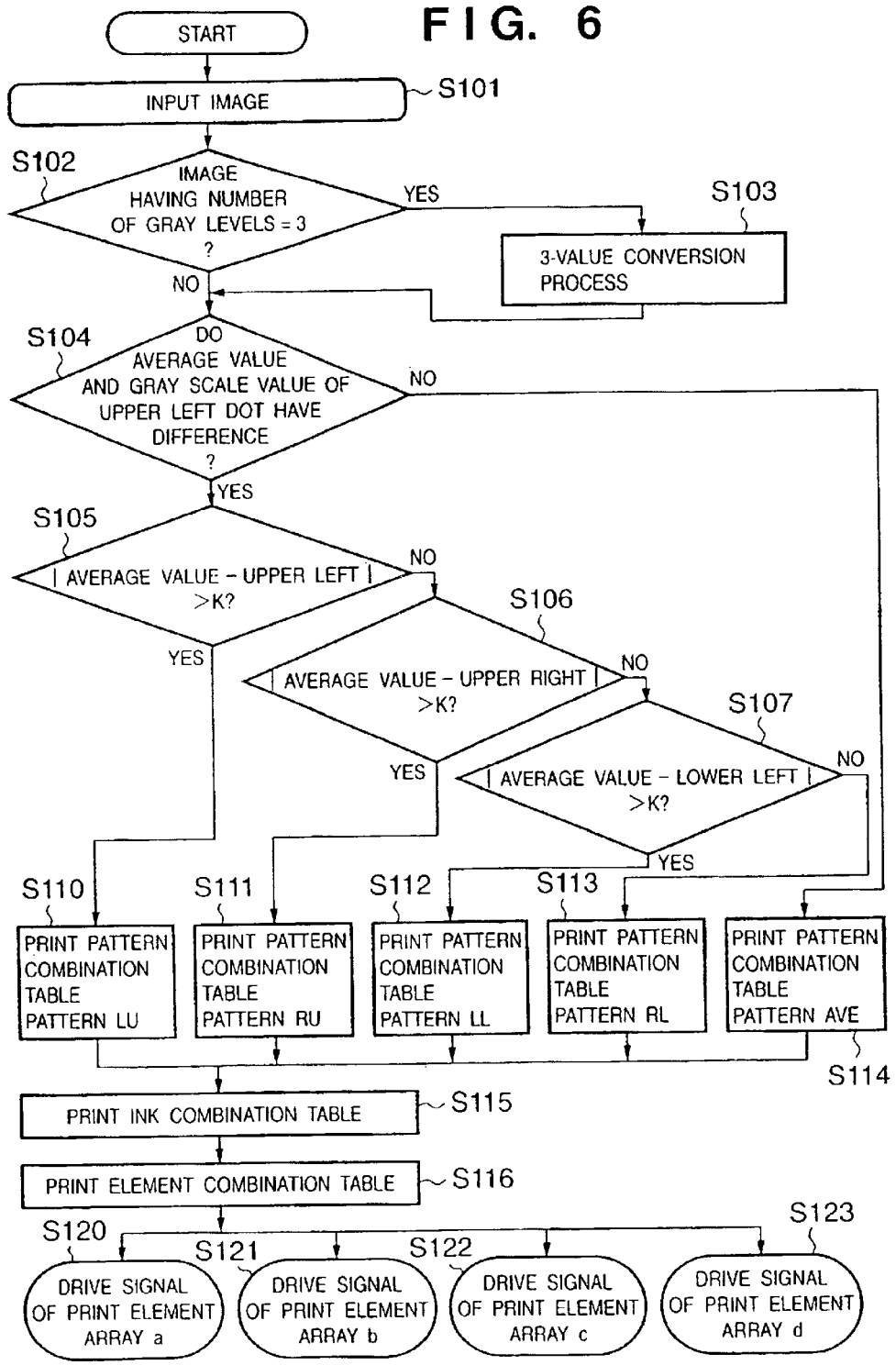
FIG. 6 is a flow chart showing the flow of an image process in the ink-jet printing apparatus according to the embodiment of the present invention.

FIG. 6 is a flow chart showing the flow of an image process in the ink-jet printing apparatus according to this embodiment.

The image process unique to this embodiment will be explained below with reference to FIGS. 3 to 6.

When the print element combination table shown in FIGS. 3 to 5 is used, the number of gray levels of a 256-level input image input in step S101 in FIG. 6 must be converted to a (2+1) value (/600 dpi). The image processor 6 in FIG. 1 executes a (2+1)-valued error diffusion process (steps S102 and S103). Note that multi-valued error diffusion is used in this process, but the present invention is not limited to such specific method, and arbitrary halftoning methods such as average density preservation, dither matrix method, and the like may be used.

The multi-valued error diffusion is different from normal error diffusion in that a plurality of threshold values (two in this embodiment) for binarization are used. These threshold values may be normally midpoints of gray levels.

The image processor 6 distributes the data that has undergone the multi-valued process as ejection/non-ejection drive signals to respective print elements in accordance with the print ink combinations shown in FIGS. 3 to 5 with reference to the print element combination information 4a in the storage medium 4. Since the source image data is at 600 dpi, multi-valued data has (2+1) values at 600 dpi, i.e., three values "0", "1", and "2" (step S103 in FIG. 6).

It is checked in step S104 if the average value of the print pixel of interest has a predetermined difference (k: e.g., k=1) from the gray level of the upper left dot. A case will be exemplified below wherein the upper left unit pixel (i1, j1) of the 2×2 print pixel (expressed by (I1, J1)) of interest has a gray scale value =2, the upper right unit pixel (i1+1, j1) has a gray scale value =1, the lower left unit pixel (i1, j1+1) has a gray scale value =1, and the lower right unit pixel (i1+1, j1+1) has a gray scale value=0. In this case, since the density gradient information indicates that the upper left density is high, a density pattern "LU" corresponding to a grayscale pattern "a" shown in FIG. 11 is selected (steps S105 and S110).

Since the gray level of the 2×2 print pixel itself is 4/8, it is determined that data are distributed on the basis of pattern information having density gradient information "LU" (i.e., combinations Nos. 45 to 48) of the print element combination information of density 4 (gray level 4) shown in FIG. 4. In practice, one of these four combinations is selected in turn or randomly (steps S115 and S116).

If the density gradient information indicates that the upper left density is not high, the process proceeds to step S106. The unit pixel is switched to the upper right unit pixel (i1+1,j1). If the density gradient information indicates that the upper right density is high, a density pattern "RU" is selected. (Step S111). If the density gradient information indicates that the upper right density is not high, flow proceeds to step S107. Here, it is determined whether the lower left unit pixel (i1,j1+1) has a high density. If the density gradient information indicates that the lower left density is high, a density pattern "LL" is selected. (Step S112). If the density gradient information indicates that the lower left density is not high, a density pattern "RL" is selected. (Step S113).

With the aforementioned process, the process for one print pixel of interest is complete. The same process is repeated for the next 2×2 print pixel (I2, J2).

For example, when the upper left unit pixel (i2, j2) of that print pixel has a gray level=2, the upper right unit pixel (i2+1, j2) has a gray scale value=2, the lower left unit pixel (i2, j2+1) has a gray scale value =2, and the lower right unit pixel (i2+1, j2+1) has a gray scale value=1, its density gradient information corresponds to grayscale pattern "1" shown in FIG. 11. Since it is difficult to determine that this pattern belongs to any of LU, RU, LL, and RL, "AVE" is selected in this case for the sake of simplicity (step S114).

Since the gray level of this print pixel is ⅞, it is determined that data are distributed on the basis of pattern information having density gradient information "AVE" (i.e., combinations Nos. 21 to 24) of the print element combination information of density 7 (gray level 7) shown in FIG. 5 (steps S115 and S116).

By repeating the aforementioned process for all print pixels on the basis of the density data of that image, binary drive signals indicating ejection/non-ejection for respective pixels of each print element array are formed (steps S120 to S123).

Figure 7:
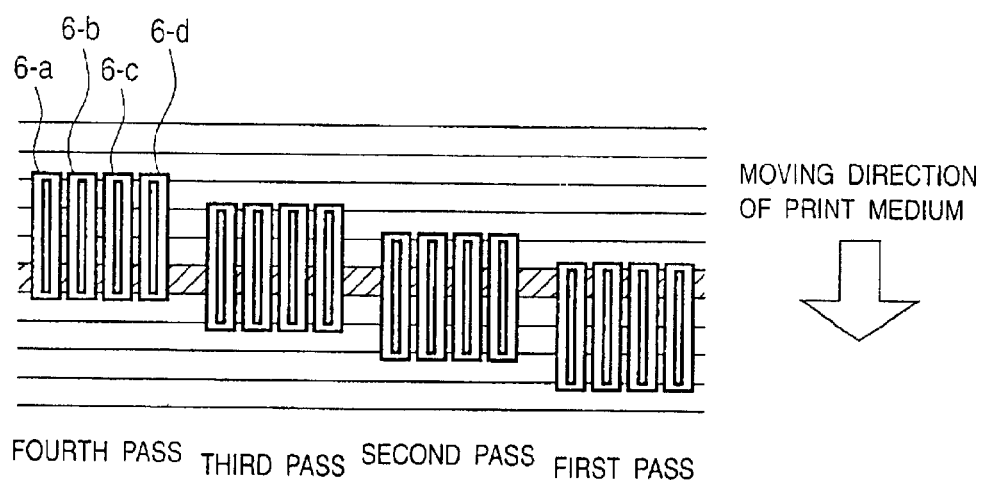
FIG. 7 is a view for explaining a multi (4)-pass printing method.

FIG. 7 shows a multi (4)-pass printing method, in which the print processes of respective passes are done by a print head 6-*a* having a print element array for discharging ink A, a print head 6-*b* having a print element array for discharging ink A, a print head 6-*c* having a print element array for discharging ink B, and a print head 6-*d* having a print element array for discharging ink B.

Figure 10:
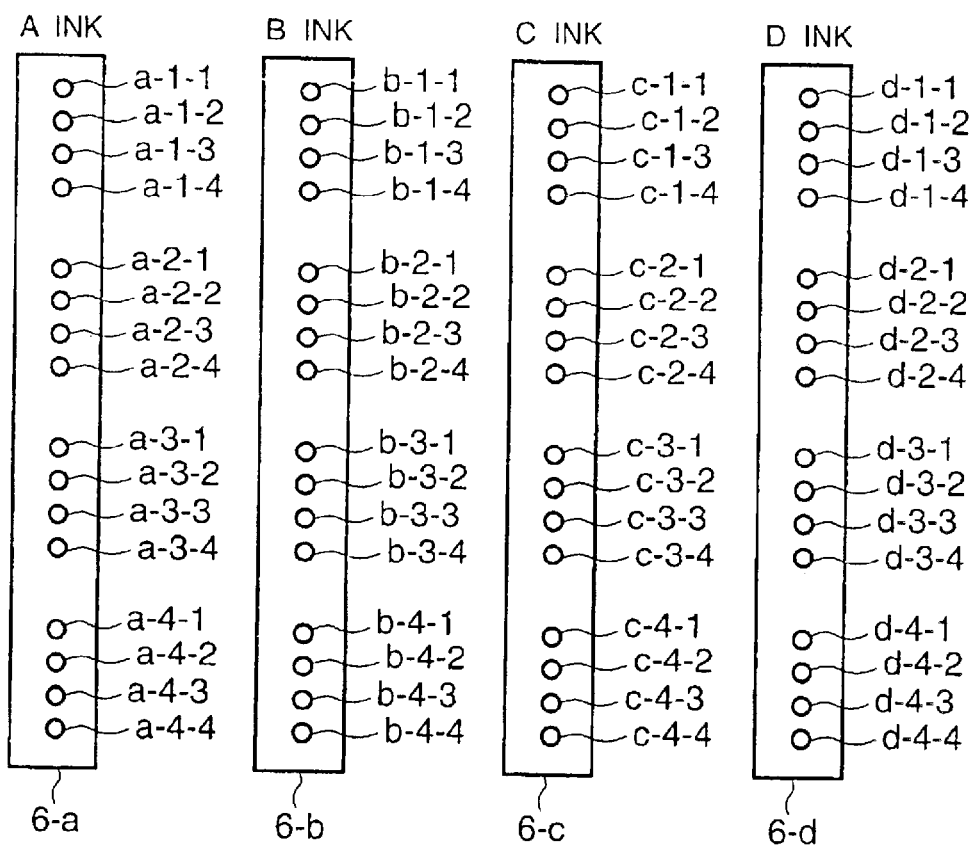
FIG. 10 shows ink-jet print element arrays that can print using four different multi-density inks.

In this embodiment, all pixels are sequentially processed, as described above, and are printed by the 4-pass printing processes by the ink-jet printing apparatus (FIG. 2) having the print element arrays shown in FIGS. 8, 9, and 10.

As described above, according to this embodiment, since a region specified by combining neighboring unit pixels of an input image defines a print pixel, and predetermined gray scale value patterns are selected for respective print pixels in accordance with the input image, the information size of the image data can be reduced to around ¼ without decreasing the resolution of the input image, and a high-speed image print process and a load reduction on the controller (CPU) can be attained.

In the ink-jet print method for printing two ink droplets on at least a single unit pixel, printing ink droplets by at least two multi-size dots, or printing at least two multi-density ink droplets for the same hue, and in the image print method for printing by discharging one or a plurality of ink droplets as needed for some unit pixels that form a print pixel as a building unit of an image to be printed, control data of patterned ejection/non-ejection drive signals are effectively processed without any complicated image processes.

Furthermore, since a plurality of pieces of print element combination information are prepared for a single gray scale value, and a print process is done sequentially or randomly using different contents of print element combination information, identical print elements can be prevented from simultaneously forming ink dots over a given area or more, and a change in characteristics can be suppressed even when the print heads are exchanged, thus positively and effectively coping with the variations of the characteristics of the print-elements.

An image which has good halftone characteristics and is free from deterioration due to "kink" or the like can be obtained by a high-speed, simple process using a simple signal algorithm, and a high-quality halftone image can be obtained even when a print process is done using low-resolution data as information.

[Modification]

The present invention is not limited to the aforementioned embodiment, and various modifications may be made. For example, two multi-density inks are prepared, and a print process is done using single dot size (see FIG. 9). The following two different inks are used, and are represented by A and B in ascending order of pigment density in ink. Table 1 shows the pigment density ratios of these inks.

TABLE 1

|  | A | B |
|---|---|---|
| Transmission Density | 0.2 | 0.8 |
| Dye Density Ratio | 1 | 4 |

Also, print elements which can print the aforementioned two different multi-density inks and also two different multi-size ink droplets are prepared (see FIG. 9). For example, in Table 2 below, A, B, C, and D respectively indicate approximate values of transmission densities when a solid print process at a print density ratio=100% is done respectively using light ink and small dots, light ink and large dots, dark ink and small dots, and dark ink and large dots. In this way, a high-quality halftone image can be obtained.

TABLE 2

|  | A | B | C | D |
|---|---|---|---|---|
| Transmission Density | 0.1 | 0.2 | 0.4 | 0.8 |
| Pigment Density Ratio | 1 | 2 | 4 | 8 |

Furthermore, four multi-density inks may be prepared. In this case, the same print process as in the above embodiment is done using a single dot size (see FIG. 10). A, B, C, and D respectively represent inks in ascending order of pigment density in the ink. Table 3 below shows the pigment density ratios of the inks. With this method as well, a high-quality halftone image can be obtained.

TABLE 3

|  | A | B | C | D |
|---|---|---|---|---|
| Transmission Density | 0.1 | 0.2 | 0.4 | 0.8 |
| Pigment Density Ratio | 1 | 2 | 4 | 8 |

In the above embodiment, the (8+1) value of a print pixel consisting of a maximum of 2×2, i.e., four unit pixels may be normalized by 256 values to numerical values 0, 32, 64, 80, . . . , 240, 255, and may be compared with the gray level of an input pixel without executing the multi-valued process of input high-definition image data to select the nearest gray scale value.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores a program code corresponding to the aforementioned flow chart (e.g., shown in FIG. 6).

As described above, the present invention can provide an ink-jet printing apparatus and method, which can print a high-definition input image having a huge image information size at high speed without deteriorating image quality, and a computer readable memory.

The present invention is not limited to the above embodiments and various changes and modifications can be made within the spirit and scope of the present invention. Therefore, to apprise the public of the scope of the present invention the following claims are made.

What is claimed is:

1. An ink-jet printing apparatus for printing a visible image on a print medium by discharging ink from a plurality of ink ejection print elements, comprising:
    means for storing a first table indicating a pixel density distribution pattern where a pixel density distribution within predetermined pixels is patterned;
    means for storing a second table indicating combinations of density distribution patterns of print pixels and the ink ejection print elements in correspondence with gray scale values;
    designation means for designating a region consisting of a predetermined number of neighboring pixels from pixels that form an input image;
    selection means for selecting the pixel density distribution pattern for the designated region from the first table; and
    control means for controlling ejection/non-ejection of ink from the plurality of ink ejection print elements by looking up the second table in accordance with the pixel density distribution pattern selected by the selection means and a gray scale value thereof,
    wherein said control means looks up the first and second tables on the basis of a value near a value obtained by dividing a sum total of gray scale values of pixels which form the region by the predetermined number of pixels.

2. The apparatus according to claim 1, wherein said selection means selects the pixel density distribution pattern on the basis of a difference between a value of a pixel of interest of the pixels that form the region, and an average value of gray scale values of all pixels which form the region.

3. The apparatus according to claim 1, wherein a plurality of combinations of density distribution patterns of the print pixels and ink ejection print elements are prepared for a single gray scale value, and said control means sequentially or randomly selects these combinations.

4. The apparatus according to claim 1, wherein said control means controls an ink-jet printing method of discharging double ink droplets onto at least a single unit pixel, and prints the visible image by discharging one or a plurality of ink droplets onto the unit pixel.

5. The apparatus according to claim 1, wherein said control means controls an ink-jet printing method of discharging ink droplets having at least two different dot sizes, and prints the visible image by discharging one or a plurality of ink droplets onto a unit pixel.

6. The apparatus according to claim 1, wherein said control means controls an ink-jet printing method of discharging at least two multi-density ink droplets for the same hue, and prints the visible image by discharging one or a plurality of ink droplets onto a unit pixel.

7. The apparatus according to claim 1, wherein the plurality of ink ejection print elements are integrated and aligned, and express a halftone image by causing a plurality of ink dots to land on substantially a single print pixel on the print medium when they are scanned a plurality of number of times in a scan direction different from an alignment direction while being moved relative to the print medium by a predetermined width in a direction different from the scan direction.

8. The apparatus according to claim 1, wherein the second table indicates a correspondence among the gray scale values, the pixel density distribution patterns and the ink ejection print elements to be used for printing.

9. An ink-jet printing method for printing a visible image on a print medium by discharging ink from a plurality of ink ejection print elements, comprising:
    a first table providing step of providing a first table indicating a pixel density distribution pattern where a pixel density distribution within predetermined pixels is patterned;
    a second table providing step of providing a second table indicating combinations of density distribution patterns of print pixels and the ink ejection print elements in correspondence with gray scale values;
    a designation step of designating a region consisting of a predetermined number of neighboring pixels from pixels that form an input image;
    a selection step of selecting a pixel density distribution pattern for the designated region from the first table; and
    a control step of controlling ejection/non-ejection of ink from the plurality of ink ejection print elements by looking up the second table in accordance with the pixel density distribution pattern selected in the selection step and a gray scale value thereof,
    wherein the control step includes the step of looking up the first and second tables on the basis of a value near a value obtained by dividing a sum total of gray scale values of pixels which form the region by the predetermined number of pixels.

10. The method according to claim 9, wherein the selection step includes the step of selecting the pixel density distribution pattern on the basis of a difference between a value of a pixel of interest of the pixels that form the region, and an average value of gray scale values of all pixels which form the region.

11. The method according to claim 9, wherein a plurality of combinations of density distribution patterns of the print pixels and ink ejection print elements are prepared for a single gray scale value, and the control step includes the step of sequentially or randomly selecting these combinations.

12. A computer readable memory that stores a program code of an ink-jet print process for printing a visible image on a print medium by discharging ink from a plurality of ink ejection print elements, comprising:

a program code of a first table providing step of providing a first table indicating a pixel density distribution pattern where a pixel density distribution within predetermined pixels is patterned;

a program code of a second table providing step of providing a second table indicating combinations of density distribution patterns of print pixels and the ink ejection print elements in correspondence with gray scale values;

a program code of a designation step of designating a region consisting of a predetermined number of neighboring pixels from pixels that form an input image;

a program code of a selection step of selecting a pixel density distribution pattern for the designated region from the first table; and a program code of a control step of controlling ejection/non-ejection of ink from the plurality of ink ejection print elements by looking up the second table in accordance with the pixel density distribution pattern selected in the selection step and a gray scale value thereof, wherein the control step includes the step of looking up the first and second tables on the basis of a value near a value obtained by dividing a sum total of gray scale values of pixels which form the region by the predetermined number of pixels.

* * * * *

UNITED STATES PATENT AND TRADEMARK OFFICE
CERTIFICATE OF CORRECTION

PATENT NO. : 6,834,926 B2
DATED : December 28, 2004
INVENTOR(S) : Shibata

It is certified that error appears in the above-identified patent and that said Letters Patent is hereby corrected as shown below:

<u>Column 11,</u>
Line 58, "print-elements." should read -- print elements. --.

Signed and Sealed this

Twelfth Day of July, 2005

JON W. DUDAS
*Director of the United States Patent and Trademark Office*